(12) United States Patent
Söchting

(10) Patent No.: US 6,491,890 B1
(45) Date of Patent: Dec. 10, 2002

(54) METHOD AND SET FOR CONTINUOUS LONG-TERM DOSING OF $CO_2$

(76) Inventor: Klaus Söchting, Sonnenhamerstrasse 13, D-82544 Attenham (DE)

( * ) Notice: Subject to any disclaimer, the term of this patent is extended or adjusted under 35 U.S.C. 154(b) by 0 days.

(21) Appl. No.: 09/559,081

(22) Filed: Apr. 27, 2000

(30) Foreign Application Priority Data

Apr. 30, 1999 (DE) .......................... 199 19 798

(51) Int. Cl.[7] .............................. C01B 31/20
(52) U.S. Cl. ................. 423/438; 422/120; 422/123
(58) Field of Search .............. 423/437.1, 438; 422/120, 123, 193, 208, 238, 292

(56) References Cited

U.S. PATENT DOCUMENTS

| | | | | |
|---|---|---|---|---|
| 4,040,342 A | * | 8/1977 | Austin et al. ............... 99/323.1 |
| 4,186,215 A | * | 1/1980 | Buchel ......................... 426/86 |
| 5,021,219 A | * | 6/1991 | Rudick et al. ............... 422/112 |
| 5,398,850 A | * | 3/1995 | Sancoff et al. ........... 222/386.5 |
| 5,499,979 A | * | 3/1996 | Wong et al. ............. 604/891.1 |
| 5,573,502 A | * | 11/1996 | LeCocq et al. ................. 604/4 |
| 5,992,700 A | * | 11/1999 | McGlothlin et al. ........ 222/187 |

FOREIGN PATENT DOCUMENTS

| | | |
|---|---|---|
| DE | 6914954 | 1/1970 |
| DE | 2554957 | 6/1977 |
| DE | 8115424 | 10/1981 |
| DE | 8125288 | 1/1982 |
| DE | 9405192 | 5/1994 |
| DE | 4414796 | 2/1995 |
| WO | WO 11248 | 10/1990 |

* cited by examiner

Primary Examiner—Stanley S. Silverman
Assistant Examiner—Edward M. Johnson
(74) Attorney, Agent, or Firm—Gary M. Nath; Todd W. Kunz; Sheldon M. McGee

(57) ABSTRACT

The invention concerns a method for continuous long term dosing of $CO_2$ in biologically used media, comprising the steps below:

i) expelling an aqueous acid solution from a storage container by means of a chemical reaction which generates gas pressure, ii) dripping the acid solution into a solid and/or liquid carbonate or hydrogen carbonate composition, and iii) supply of the corresponding $CO_2$ to the medium which is used biologically, as well as a set and a reequipment set for carrying out this method.

35 Claims, 1 Drawing Sheet

METHOD AND SET FOR CONTINUOUS LONG-TERM DOSING OF CO₂

The present invention concerns a dosing method for the controllable and continuous generation of carbon dioxide ($CO_2$) and its issue in biologically used systems as well as a set and a reequipment set which make possible the implementation of this method.

In various fields of the maintenance of biological systems there is a need for an even and targeted supply of $CO_2$ over a lengthy period. For example, this is the case in the cultivation or preservation of plants in closed premises, such as for example in greenhouses, and in particular in aqueous systems, for example in ponds or aquaria.

To supply ponds or aquaria with $CO_2$, various processes are known in the prior art.

For example, the supply can be carried out by gas dosing systems from gas cartridges which are pressure charged with $CO_2$. But this method has the drawback that with decreasing gas pressure in the cartridge, the amount of $CO_2$ which is supplied per unit of time continuously decreases without later control of the dosing system. In addition, a $CO_2$ dosing system requires a large amount of space when using gas cartridges and is aesthetically unsatisfactory. This is disadvantageous, especially in the case of ornamental pools and aquaria.

A further known method is the in situ generation of $CO_2$ from a carbonate due to the influence of a mineral acid, which is usually hydrochloric acid in a Kipp's apparatus. However, such a device can only be operated suitably outside the water which is to be supplied, and it is therefore linked with the same spatial and aesthetic inadequacies as the method which was described above. In addition, the handling of mineral acids such as hydrochloric acid by inexperienced users is not without its problems.

In addition, a method was suggested in which from an effervescent tablet of sodium hydrogen carbonate and citric acid $CO_2$ is released in doses by the slow addition of water. The disadvantage of this method is that with a slow supply of water in a short time an impermeable citrate layer is formed on the effervescent tablet, which impedes a further reaction. Thereby the continuous generation of $CO_2$ can only be ensured for a short period of a few days.

To overcome the problems named above, a method is made available which makes possible the controlled generation of $CO_2$ which is constant over a long period, i.e. a method for the .continuous long term dosing of $CO_2$ in media which are used biologically, comprising the steps below:

i) expulsion of an aqueous acid solution from a storage container by means of a chemical reaction generating gas pressure, ii) dripping the acid solution into a solid and/or liquid carbonate or hydrogen carbonate composition, and iii) supplying the resultant $CO_2$ to the medium in use biologically.

In addition, the object above is achieved by the set made available in accordance with the invention for implementation of the process, which comprises a storage container (1), a unit amount of a carbonate or hydrogen carbonate or a mixture of two or more such compounds and a storage container (2) to be placed thereon or therein for the aqueous acid solution with an exit aperture, which permits the dripping into the (hydrogen) carbonate or its solution; and which is charged with a composition which comprises (i) a solid water soluble acid, (ii) a water soluble and preferably solid compound, which can be catalytically decomposed with the development of gas, and (iii) a catalyst.

In addition, a reequipment set is used to solve the problem above, which comprises the necessary initial substances for carrying out the method as well as replacement parts of the apparatus which is used. More precisely, the reequipment set of the present invention comprises a unit amount of a carbonate or hydrogen carbonate or a mixture of two or more such compounds and a storage container (2) for the aqueous acid solution with an exit aperture, which permits the dripping into the carbonate solution, and which is charged with a composition, which comprises (i) a water soluble acid, (ii) a compound which can be decomposed catalytically with the development of gas, and (iii) a catalyst.

Additional aspects and preferred features of the invention are defined in the appended claims. It will be appreciated that where a preferred feature is described or defined with respect to one aspect of the invention, it is equally applicable to other aspects of the invention without requiring explicit mention thereof.

The method in accordance with the invention for the continuous dosing of $CO_2$ has the following steps:

i) expulsion of an aqueous acid solution from a reserve container by means of a chemical reaction which generates gas pressure, ii) dripping the acid solution into a solid and/or liquid carbonate or hydrogen carbonate composition and iii) supplying the resultant $CO_2$ to the biologically used medium.

The following advantageous effects are achieved by this method and by the sets and reequipment sets which are used for its implementation:

the release of $CO_2$ is carried out economically and in the smallest space.

A large amount of $CO_2$ can be stored in the initial substances and can be issued over a lengthy period.

The generation of $CO_2$ can be adjusted in accordance with the requirement of the user and it is constant over a long period.

In aquaria, the $CO_2$ can be issued into the water without hose connections, and without impurities with other substances resulting.

The reference to "carbonate" or to "carbonate solution" also includes in following hydrogen carbonates and all their solutions, to the extent that nothing else is stated.

The above named aqueous solution of an acid can be a solution of any discretionary acid, which is in a position to form an adequately stable aqueous solution, and which is also suitable to release $CO_2$ by reaction with a carbonate or its aqueous solution. Preferably the acid which is used is a solid compound in its pure form, from which the aqueous solution is only produced directly before use.

Equally it is preferred that due to the reaction of the acid with the carbonate, a salt is formed, the solubility of which is so high that it does not precipitate out of the aqueous mixture, which is formed by dripping the acid solution into the carbonate or its solution. Moreover, mixtures of two or more acids can be used.

The carbonate in which or in the solution of which the aqueous acid solution is dripped is a discretionary carbonate or hydrogen carbonate compound. As stated above, it is preferable that the salt which results from the reaction with the acid which is dripped in remains dissolved. Mixtures of two or more carbonate compounds can also be used.

In addition, preferably both the initial compounds as well as the resultant salt should be unproblematic as to health and ecology, and the amount of $CO_2$ which can be released therefrom, based on the weight of the initial substances, should be as large as possible.

Carbonate compounds which are to be used for preference are the carbonates and hydrogen carbonates of the alkali metals, and special preference is given to sodium hydrogen carbonate.

An acid used with special preference is citric acid.

The named components have moreover the advantages that they are economically obtainable and are easy to store and to transport.

The gas pressure generating reaction which is used to expel the acid solution from the storage container is the reaction of a compound which is dissolved or suspended in the aqueous acid solution with the release of a gaseous reaction product. Preferably this concerns the decomposition of a metastable compound, e.g. a peracid compound, such as hydrogen peroxide or derivates thereof. Mixtures of two or more compounds which are compatible with each other can also be used.

The decomposition can be catalyzed by a suitable catalyst. Due to suitable dosing of the catalyst, the amount of the gas volume which is generated can be adjusted per unit of time and therefore the expulsion speed of the acid solution can be exactly adjusted within a broad range. Here it must be taken into consideration that the temperature of the surrounding system has an influence on the reaction speed of the catalyzed reaction. Therefore in warmer environments, such as, for example, tropical aquaria, smaller amounts of catalyst are necessary to achieve the same amounts of gas per unit of time than in colder media.

In addition it is also possible to introduce the catalyst totally or partially directly before the use in the acid container. Thereby the output speed of the acid solution and thereby the amount of $CO_2$ generated per unit of time can be adjusted individually by the user.

Any of the compounds which are known in the prior art as decomposition catalysts are suitable as the catalysts, which A have the effect of catalytic decomposition of the above named compounds, with the generation of gaseous products. When using $H_2O_2$ or peroxide compounds, $MnO_2$ or platinum is a preferred catalytic material, with special preference for ceramically bound $MnO_2$. Mixtures of two or more catalysts which are compatible with each other can also be used.

Preferably the composition of the components in the storage container is adjusted at the start of the process in accordance with the invention so that the gas volume which results from the reaction which generates the gas pressure is adequate to expel the entire aqueous acid solution from the storage container. At the same time, the amount of the component which is to be decomposed to form the gaseous products should be dimensioned so that the total acid solution is issued at almost constant expulsion speed from the storage container. The amounts which are necessary and/or suitable for this purpose can be varied depending on the specific form of the system which is used. However, mix ratios of 0.01 to 0.03 mole of the compound to be decomposed to 1 mol of the acid to be expelled have been found to be suitable.

The gaseous $CO_2$ which results from dripping the acid solution into the carbonate or its solution, is supplied via suitable gas line devices to the media which are used biologically. In the case of aqueous biological media such as, for example, ponds or aquaria, the $CO_2$ can preferably be in contact with the water surface by means of a diving bell and can be diffusively dissolved in the water via this bell. What is meant here by the water surface is both the surface of the water to be supplied as well as an artificially generated water surface within the water below the diving bell, which is in contact with the gas volume of a device which is suitable to carry out the method in accordance with the invention.

BRIEF DESCRIPTION OF THE DRAWING

Such a device is schematically shown in a preferred embodiment for use in a pond or an aquarium in FIG. 1.

It comprises a storage container (1) for the carbonate and/or its solution, a storage container (2) to be attached therein for the aqueous acid solution.

Figure 1:
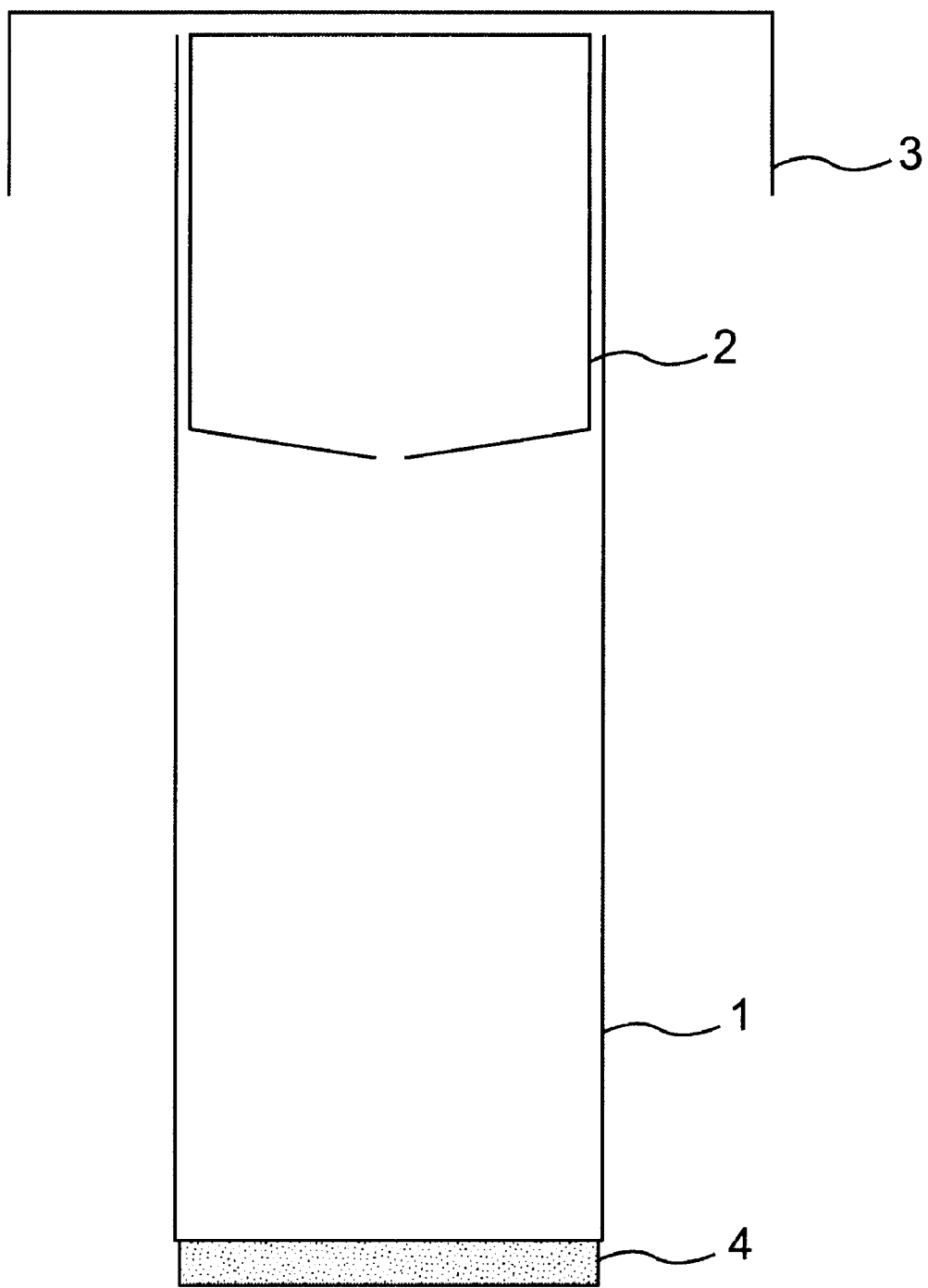

To the extent that this is necessary, the device in addition has a gas supply system, by which the resultant $CO_2$ is introduced into the biological medium which is to be supplied. This is the case, in particular, with aqueous biological media such as ponds or aquaria. In a preferred embodiment, the dosing device is provided with a diver's bell which makes it possible to use the device below water and for the $CO_2$ below the diver's bell to make contact with an artificially created water surface. Such a preferred device is shown schematically in FIG. 1 (diver's bell (3)).

In addition, a device is present for use optionally in water which ensures that the device remains below the water surface and does not float to the top.

In one embodiment an additional weight (4) can be used which is dimensioned so that the device when in operation has a greater weight than the amount of liquid which is expelled by it.

Alternatively (4) shows one or more suction cups, with which the device can be brought to adhere to the base of the pond or of the aquarium. In this case, weighting by means of weights can be omitted.

The set in accordance with the invention to carry out the process for continuous long term dosing of $CO_2$ in media which are used biologically comprises a suitable dosing device, an amount coordinated with it of a carbonate compound and a mixture of an acid which is in the storage container and is suitably coordinated with it, a compound which is to decompose gaseous products during generation and optionally the catalyst necessary for this purpose.

Preferably in the set in accordance with the invention all the chemical components are present in solid form, because this makes the set easier to produce and to handle, then when it contains liquid components. In addition, the stability of chemical compounds of the type which is present here in solid form is improved against their aqueous solutions. Therefore it is preferred that the solutions to be used are produced only directly before their use. Thereby it is ensured that the set functions without problems even after longer storage and that $CO_2$ is supplied in the desired amount per unit of time.

The storage container for the acid solution is designed so that at one point which is in use below the liquid level of the aqueous acid solution there is an outlet aperture. This outlet aperture is dimensioned so that the acid solution does not flow away through the exit aperture. On the other hand, the aperture must be large enough for the exit of droplets to be possible on the basis of the pressure built up in the decomposition process. Preferably the exit aperture is of circular or approximately circular cross section with a diameter of 1 to 7 mm. Further preference is given to the exit aperture being located at the deepest point of the storage container in use, whereby the acid solution which is inserted can be fully exploited to generate $CO_2$, and no residue remains in the storage container.

The reequipment set in accordance with the invention for carrying out the method in accordance with the invention comprises a) an amount of a carbonate which is adapted to the respective unit to be used in suitable packaging and b) a storage container (2), which is charged with a composition, comprising (i) a solid water soluble acid, (ii) a preferably solid compound which can be decomposed catalytically with the development of gas and (iii) a catalyst.

In a preferred embodiment the storage container (2) which is charged with the reaction mixture for the storage container (2) is an integral, firmly closed hollow body, the only aperture of which is the exit aperture for the acid solution. During the storage and transport until directly the point in time of use, this exit aperture is preferably firmly closed, for example with an adhesive strip, a tear off foil or the like.

The dimensioning of the set in accordance with the invention as well as the dimensioning of the reequipment set in accordance with the invention can vary depending on the desired use within a broad range. The dimensioning is guided by the air or water volume which is to be supplied with $CO_2$, the desired $CO_2$ concentration which is to be maintained within this volume and the period for which continuous supply is to be guaranteed without interruption.

For use the acid mixture in the container is dissolved by the addition of water via the exit aperture in the predetermined amount of water. In the reaction chamber under the storage container (2), a suitable amount of carbonate is inserted; preferably in the form of tablets. This is advantageously an amount which is precisely adequate for the total consumption of the acid. Depending on the chemicals used and the amount of water which is inserted, it may be necessary to add further water to the reaction chamber, so that the corresponding salt is not precipitated.

Preferably the amount of water is determined by the volume of a filling container enclosed with the set or reequipment set in accordance to the invention, from which firstly the storage container (2) is filled and the remaining amount of water is inserted in the reaction chamber.

For example, with a total volume of the set in accordance with the invention of 1 liter, in which the storage chamber holds ⅓ liters and the reaction chamber ⅔ liters, about 160 g or 87 liters $CO_2$ (at 20° C.) can be generated. For this purpose, for example, 232 g citric acid and 306 g sodium hydrogen carbonate are necessary. The resultant tri sodium citrate remains fully dissolved. The named amounts of $CO_2$ which is generated is sufficient to cover the requirement of a well planted aquarium with 1000 liters of content for 1 month.

For smaller aquaria, correspondingly smaller sets are needed. For an aquarium with 100 liters of content, the result accordingly is a volume of 100 ml and 23.2 g citric acid and 30.6 g sodium hydrogen carbonate are used to generate 8.7 liters of $CO_2$.

A standardized set for a 100 liter aquarium can also be used in larger aquaria by the addition of a suitable catalyst, whereby the performance is increased, but the service life is correspondingly reduced. By doubling the catalyst, for example, the amount of $CO_2$ which is generated by unit of time is doubled, but the service life is halved.

What is claimed is:

1. A method for the continuous dosing of $CO_2$ in a biologically used medium, comprising the steps below:
   i) expulsion of an aqueous acid solution from a first storage container by means of a first chemical reaction proceeding within said first storage container which generates gas pressure,
   ii) dripping said aqueous acid solution expelled from said first storage container into a solid and/or liquid carbonate or hydrogen carbonate composition to generate $CO_2$ by a second chemical reaction of said aqueous acid solution with said carbonate or hydrogen carbonate composition, and
   iii) supplying said $CO_2$ generated by said second chemical reaction to said biologically used medium.

2. A method in accordance with claim 1, wherein the biologically used medium is water.

3. A method in accordance with claim 2, wherein the supply of the resultant $CO_2$ to the water is carried out by diffusive solution of the resultant $CO_2$ by means of a diver's bell.

4. A method in accordance with claim 1, in which the aqueous acid solution is a citric acid solution.

5. A method in accordance with claim 1, wherein the carbonate or hydrogen carbonate is sodium hydrogen carbonate.

6. A method in accordance with claim 1, in which the first chemical reaction which generates gas pressure is the reaction of a hydrogen peroxide compound with release of oxygen.

7. A method in accordance with claim 6, wherein the first chemical reaction which generates gas pressure is the reaction of hydroperoxy urea.

8. A method in accordance with claim 1, in which the first chemical reaction generating gas pressure is catalyzed by one or more catalysts.

9. A method in accordance with claim 8, wherein the catalyst is manganese dioxide.

10. A method in accordance with claim 9, wherein the manganese dioxide is bound ceramically.

11. A set for carrying out the method for the continuous dosing of $CO_2$ in media which are used biologically, comprising:
    an aqueous acid solution which is charged with a composition which comprises:
      (i) a solid water soluble acid,
      (ii) a water soluble compound which can be catalytically decomposed to develop a gas, and
      (iii) a catalyst,
        said aqueous acid solution contained in a first storage container which has an exit aperture permitting the dripping of the aqueous acid solution through the exit aperture;
        a second storage container, said first storage container placed thereon or therein the second storage container such that the aqueous acid solution drips through said exit aperture into the second storage container said second storage container further containing a unit amount of a carbonate or hydrogen carbonate or a mixture of two or more such compounds.

12. A set in accordance with claim 11, which has in addition a gas supply system, via which the resultant $CO_2$ is introduced into the biological medium to be supplied.

13. A set in accordance with claim 12, in which the gas supply system is the diver's bell.

14. A set in accordance with claim 11, which comprises moreover a weight (4), which is dimensioned so that the set in the state ready for use has a greater weight than the amount of liquid displaced by it, when it is fully immersed in an aqueous medium.

15. A set in accordance with claim 11, which in addition comprises one or more suction cups (4).

16. A set in accordance with claim 11, wherein the compounds (ii) and (iii) for the chemical reaction generating gas pressure are present in the storage container.

17. A set in accordance with claim 11, wherein the biologically used medium is water.

18. A set in accordance with claim 11, in which the aqueous acid solution is a citric acid solution.

19. A set in accordance with claim 11, wherein the carbonate or hydrogen carbonate is sodium hydrogen carbonate.

20. A set in accordance with claim 11, in which the chemical reaction which generates gas pressure is the reaction of a hydrogen peroxide compound with release of oxygen.

21. A set in accordance with claim 20, wherein the chemical reaction which generates gas pressure is the reaction of hydroperoxy urea.

22. A set in accordance with claim 11, in which the chemical reaction generating gas pressure is catalyzed by one or more catalysts.

23. A set in accordance with claim 22, wherein the catalyst is manganese dioxide.

24. A set in accordance with claim 23, wherein the manganese dioxide is bound ceramically.

25. A set in accordance with claim 11, wherein said water soluble compound which can be catalytically decomposed is a solid.

26. A reequipment set to carry out the method for the continuous dosing of $CO_2$ in media which are used ad biologically, comprising
   a unit amount of a carbonate or hydrogen carbonate or a mixture of two or more such compounds and
   a first storage container for the aqueous acid solution, said first storage container with an exit aperture, which permits the dripping into the carbonate solution, and which is charged with a composition which comprises:
   (i) a water soluble acid,
   (ii) a compound which can be decomposed catalytically with the development of a gas, and
   (iii) a catalyst.

27. A reequipment set in accordance with claim 26, in which the water soluble acid is a solid compound.

28. A reequipment set in accordance with claim 26, in which the compound which can be decomposed catalytically with the development of gas is a solid compound.

29. A reequipment set in accordance with claim 26, wherein the compounds (ii) and (iii) for the chemical reaction generating gas pressure are present in the storage container.

30. A reequipment set in accordance with claim 26, wherein the biologically used medium is water.

31. A reequipment set in accordance with claim 26, wherein the carbonate or hydrogen carbonate is sodium hydrogen carbonate.

32. A reequipment set in accordance with claim 26, in which the chemical reaction which generates gas pressure is the reaction of a hydrogen peroxide compound with release of oxygen.

33. A reequipment set in accordance with claim 32, wherein the chemical reaction which generate gas pressure is the reaction of hydroperoxy urea.

34. A reequipment set in accordance with claim 26, wherein the catalyst is manganese dioxide.

35. A reequipment set in accordance with claim 34, wherein the manganese dioxide is bound ceramically.

* * * * *

UNITED STATES PATENT AND TRADEMARK OFFICE
CERTIFICATE OF CORRECTION

PATENT NO. : 6,491,890 B1
DATED : December 10, 2002
INVENTOR(S) : Klaus Söchting It is certified that error appears in the above-identified patent and that said Letters Patent is hereby corrected as shown below:

Column 7,
Line 26, delete "ad".

Signed and Sealed this

First Day of April, 2003

JAMES E. ROGAN
*Director of the United States Patent and Trademark Office*